P. P. STEWART.
COOKING STOVE.
No. 3,041. Reissued July 14, 1868.
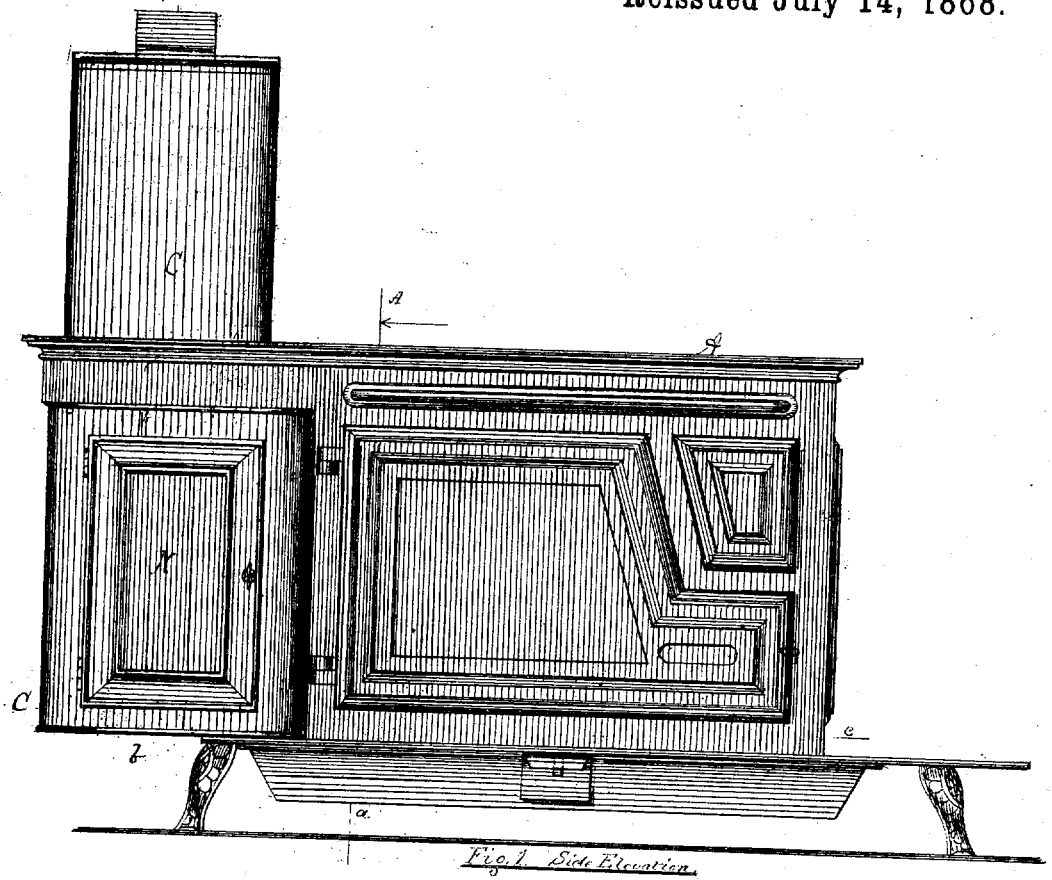
Fig. 1. Side Elevation.
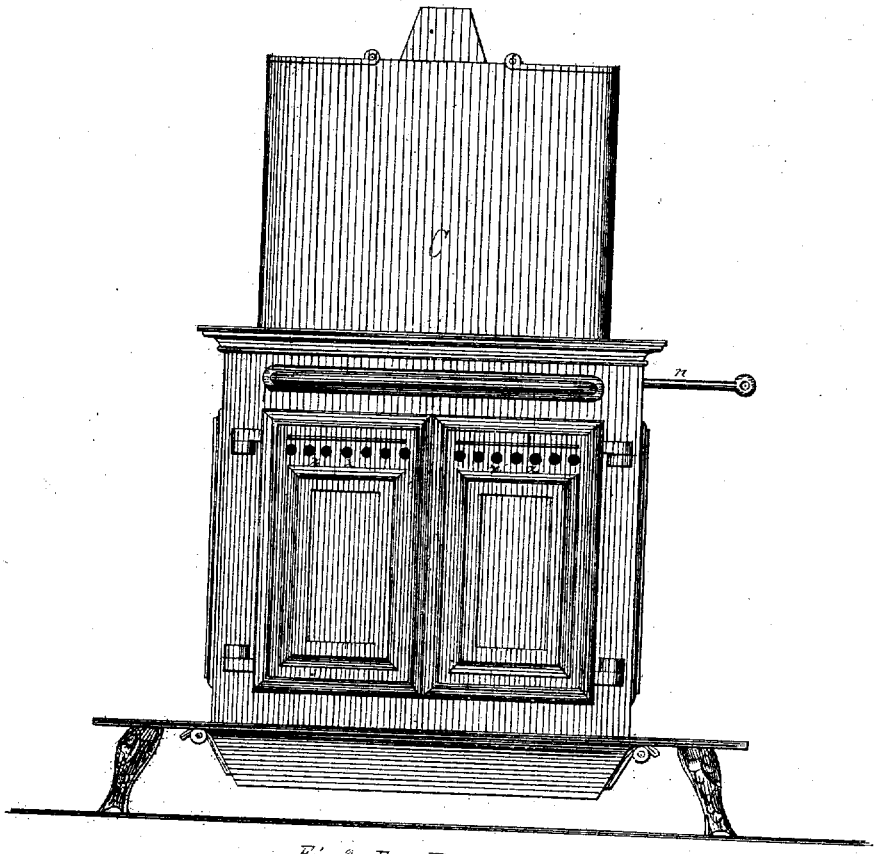
Fig. 2. Front Elevation.

P. P. STEWART.
COOKING STOVE.
No. 3,041. Reissued July 14, 1868.
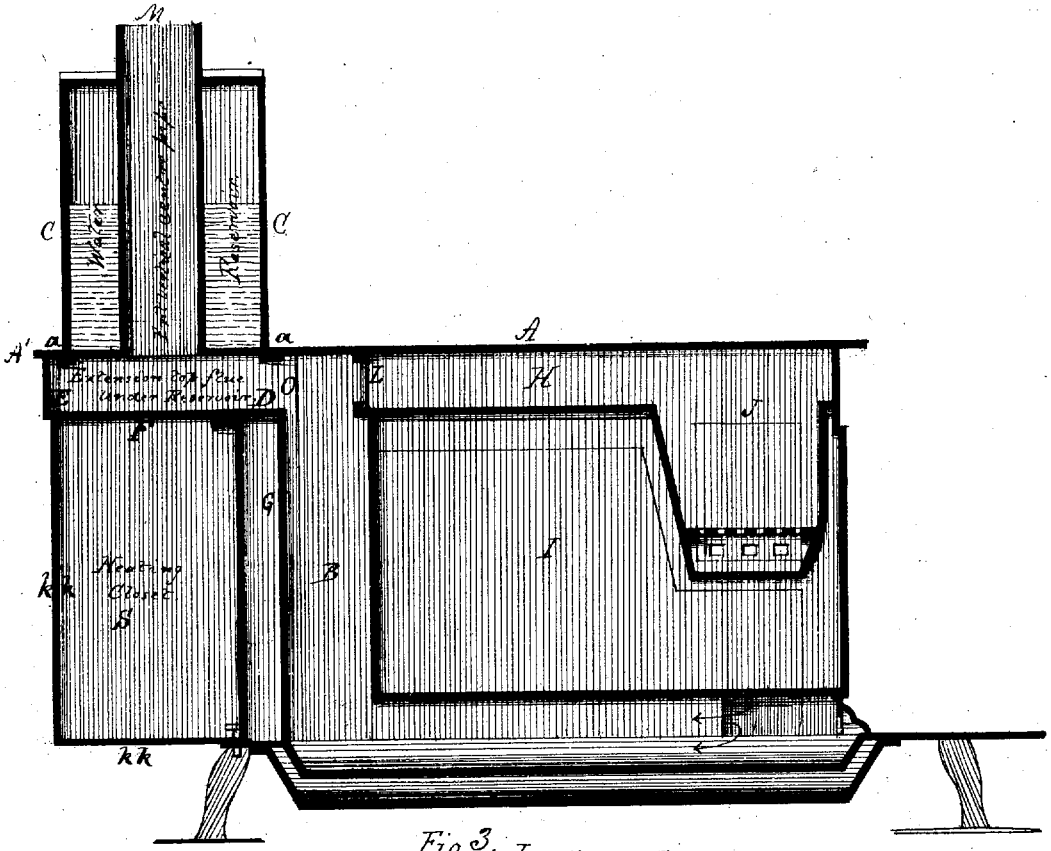
Fig. 3. Longitudinal Section.
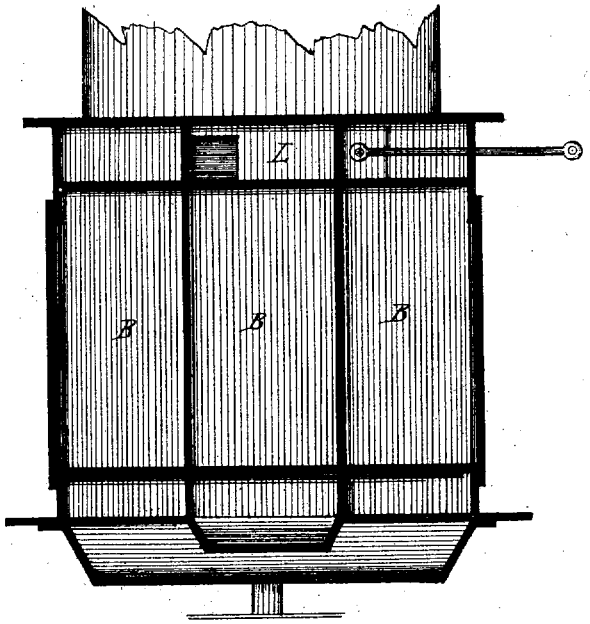
Fig. 4.
Cross Vertical Section at Aa.

P. P. STEWART.
COOKING STOVE.
No. 3,041. Reissued July 14, 1868.
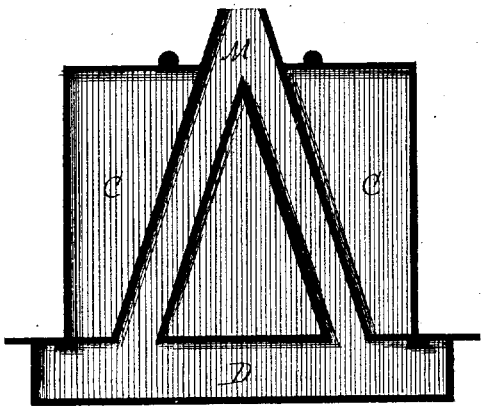
Fig. 5. B-b Vertical Section Through the Boiler.
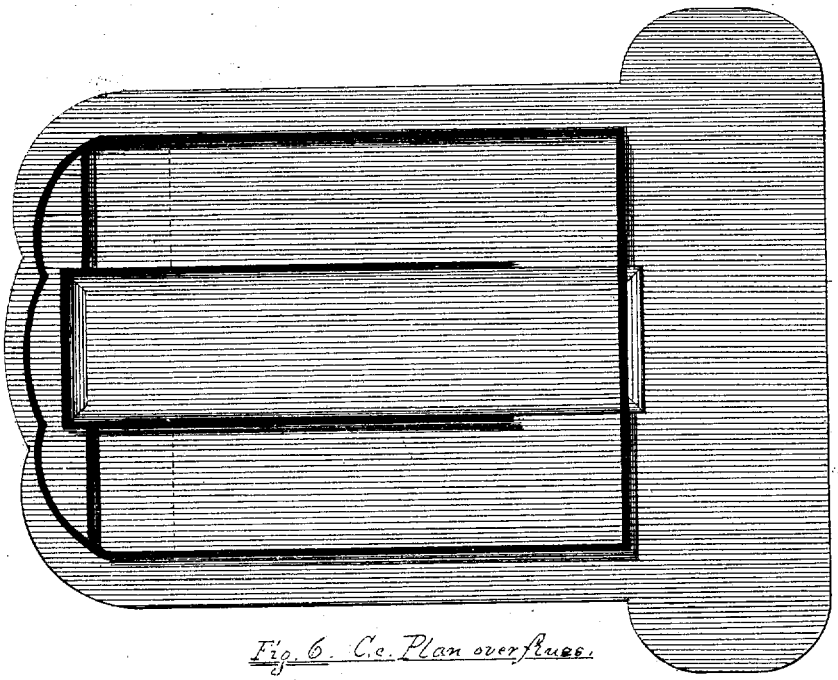
Fig. 6. C-c. Plan over flues.

P. P. STEWART.
COOKING STOVE.
No. 3,041. Reissued July 14, 1868.
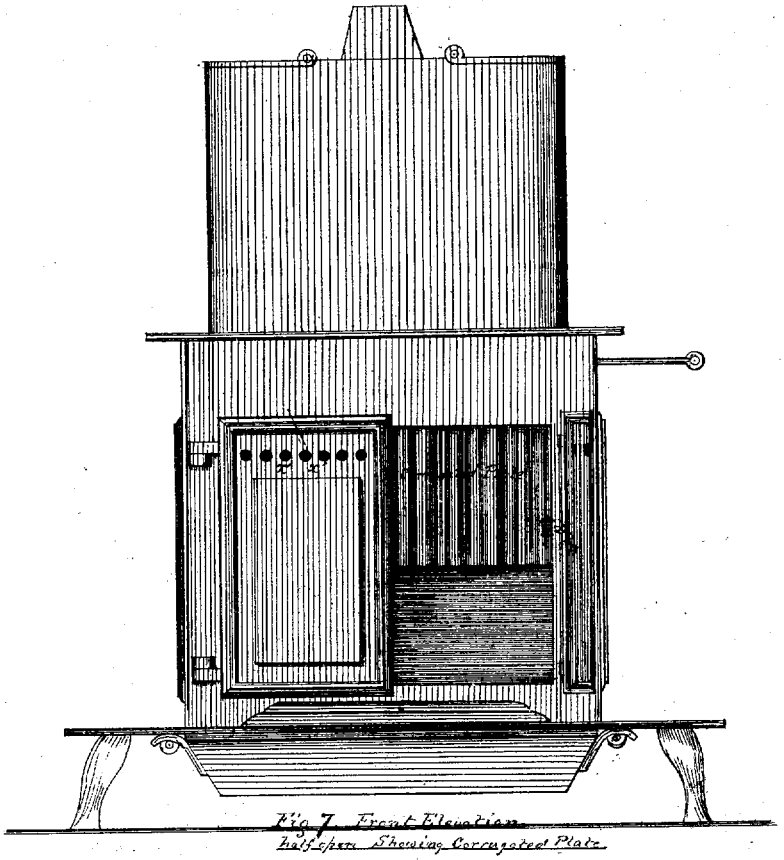
Fig. 7. Front Elevation
Half open Showing Corrugated Plate
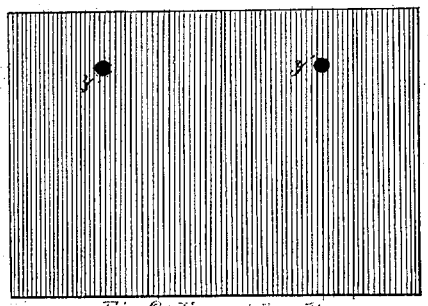
Fig. 8. Front of Back Plate.

P. P. STEWART.
COOKING STOVE.
Reissued July 14, 1868.
No. 3,041.
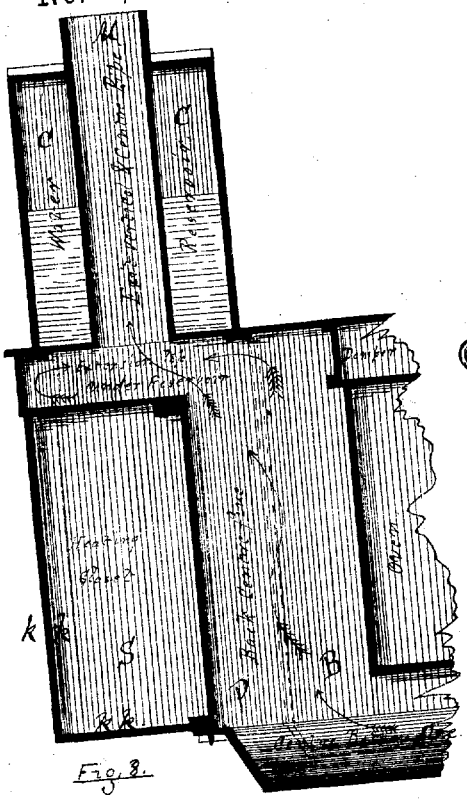
Fig. 8.
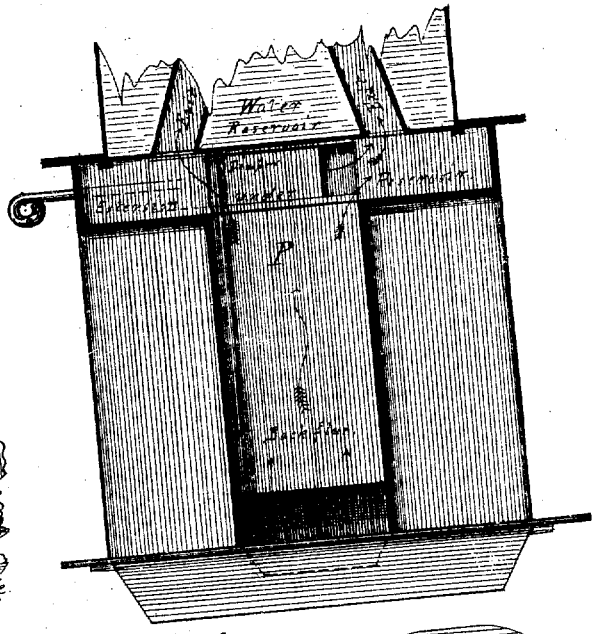
Fig. 9.
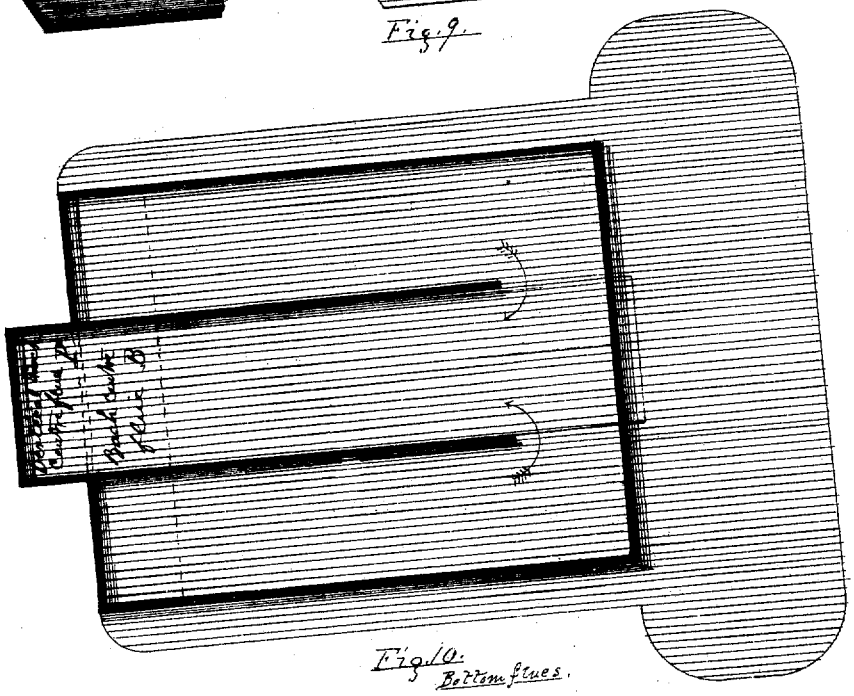
Fig. 10. Bottom flues.
WITNESSES.
Charles D. Ellison
R. A. Reille
INVENTOR.
Philo P. Stewart

United States Patent Office.

PHILO P. STEWART, OF TROY, NEW YORK.

*Letters Patent No.* 22,681, *dated January* 18, 1859; *reissue No.* 1,684, *dated May* 31, 1864; *reissue No.* 3,041, *dated July* 14, 1868.

DIVISION B.

IMPROVEMENT IN COOKING-STOVES.

The Schedule referred to in these Letters Patent and making part of the same.

TO ALL WHOM IT MAY CONCERN:

Be it known that I, PHILO P. STEWART, of the city of Troy, in the county of Rensselaer, and State of New York, did, on the 18th day of January, A. D. 1859, obtain of and from the United States of America certain Letters Patent for and upon new and useful Improvements in Cooking-Stoves, which said Letters Patent were duly surrendered, and thereafter duly reissued, as provided by the law, bearing date the 31st day of May, 1864, and which said reissued Letters Patent have been found to be defective, in that they do not cover and embrace in the claims thereof all of the original invention and improvements contained in the drawings and models originally filed in the United States Patent Office, on the 17th day of August, 1855, which application, after being once rejected, was withdrawn, and a new application upon the same invention and improvements was duly filed, as by law made and provided, on the 20th day of October, 1858, each of which was in due form of law, but neither of which contained in the specifications and claims thereof the entire invention and improvements contained in the original drawings and models so filed; and being desirous to reissue the Letters Patent herewith surrendered in the manner as stated in accompanying petition, in two separate divisions, with a separate patent upon each division, I have prepared specifications and drawings of my said original invention and improvements. Now, therefore, I do hereby declare that the following specification is a full, clear, exact, and more full description of that part of my said invention and improvements mentioned, and contained in the claims hereunto annexed, as well as of the construction, arrangement, and operation of the same, reference being hereby had to the accompanying drawings, and to the letters of reference marked thereon, and a part hereof.

Like letters represent and refer to like or corresponding parts.

Figure 1 is a side elevation of a cooking-stove containing my invention, hereinafter set forth in detail.

Figure 2 is a front elevation, showing the front doors and apertures therein, and hereinafter described and set forth.

Figure 3 is a longitudinal vertical section, and showing the invention and improvements embraced in and covered by the claims hereto annexed.

Figures 4, 5, and 6 are sections, taken at and on the lines $A^a$ $B^b$ $C^c$ of fig. 1.

Figure 7 is a front elevation, showing the front of the fire-box, and the hot-air chamber or hot-air flue between the same and the front doors, and communicating with the oven, which invention and improvements are described and contained in another specification, of even date herewith, and known as the first division of this application, upon which this specification is founded.

Figure 8 represents a rear end vertical section of my cooking-stove, containing a reservoir, hot or warming-closet, also a chamber, extending from the bottom plate of the stove to the under side or bottom of such reservoir or water-tank, and formed by the removing of a sufficient part or portion of the rear end vertical plate of such stove to form and complete such flue or chamber for admitting hot air or the heated escaping products of combustion to the bottom or under side of such reservoir, in order to heat the water therein, each and all of which is had, done, and performed in the manner substantially as hereinafter described and set forth.

Figure 9 is a cross vertical section on the dotted line shown at fig. 10 of the same drawings, and it shows an opening in and through the rear vertical end plate of my cooking-stove, through and by means of which heat, hot air, or the heated escaping products of combustion are conveyed to the proper part or portion of the reservoir or water-tank for the purposes substantially as herein described and set forth.

Figure 10 represents the bottom part of my cooking-stove, just below and immediately underneath the oven, and also showing a cross view of the opening in and through the rear end vertical flue, through and by means of which heat or the heated escaping products of combustion are conducted to and into a chamber outside and beyond such rear vertical end plate of the stove, and under the bottom part of the reservoir or water-tank, for the purpose of warming or heating water therein, in the manner substantially as hereinafter described and set forth.

As a matter of convenience, I have caused the drawings to be made on five separate sheets, and numbered them, respectively, Nos. I, II, III, IV, and V.

The matter of invention and improvement contained in the several figures, 4, 6, 7, and 8, will be set forth and described in the specification of the first division hereof, as aforesaid.

The nature of my invention and improvements, described and claimed in this specification, consists in the combination and projection of the flue extending from the fire-box or fire-chamber over the top plate of the oven, and over the immediate upper ends of the vertical flues of the rear end of the cooking-stove, out and beyond the vertical rear-end plate and end flues of the cooking-stove, in such manner as to receive, and for the purpose of receiving and supporting, a boiler, reservoir, or water-tank, for the heating of water therein for any purpose or use required in any kitchen, and which is accomplished by the escaping hot air or escaping heated products of combustion, by the use of a pipe or pipes passing through said boiler, reservoir, or water-tank, or by means of such hot air or escaping heated products of combustion coming underneath and in contact with the bottom of such boiler or water-tank, or with any part thereof, all of which is hereinafter more fully described and set forth, as to the construction and operation of that part of my said invention contained in the claims thereof, hereto annexed, or specified in this division of the same, as aforesaid, and shown and represented at fig. 3 of the accompanying drawings.

It also consists in the employment of a heating or warming-closet directly underneath the aforesaid flue or chamber, which flue or chamber is directly underneath the reservoir or water-tank, and communicating with the flue extending from the fire-box or chamber over the top of the oven, and over the upper part of the vertical flues at the rear end of the cooking-stove, and immediately back of the oven therein, and which is constructed in the manner as hereinafter set forth and described, and which heating or warming-closet is also, and at the same time, situated at the immediate rear end of the cooking-stove, and fastened thereto in some suitable manner and by some suitable means, for the purposes substantially as herein specified and set forth.

It also consists in constructing the rear vertical end plate of a cooking-stove with a suitable opening in and through such end plate of the stove, and at or near the top part of the same, so as to allow or permit the heat, hot air, or heated escaping products of combustion to pass from the fire-box or chamber of combustion of the stove through a proper flue, to and into a suitable chamber outside of the rear vertical end plate of a cooking-stove, and just underneath or below a reservoir or water-tank to contain water, to be heated therein by means of such heat in the chamber formed underneath such reservoir, and conducted thereto in the manner and by the means substantially as hereinafter described and set forth.

It also consists in the construction of a flue or chamber in and projecting out from the rear-end vertical plate of a cooking-stove, and extending from the flue or flues in the bottom of the stove, and just below the bottom plate of the oven of such stove, up to and immediately below and against the bottom part or portion of the reservoir or water-tank, resting upon and over a suitable chamber, to receive and contain the heat, hot air, or heated escaping products of combustion, and thus and thereby warm or heat the water therein, in the manner substantially as herein described and set forth.

It also consists in the construction and arrangement of the reservoir, boiler, or water-tank upon the immediate top of the outward-projecting top plate of a cooking-stove, over and from the rear end thereof, and resting upon such projection or continuation-plate or part, and thus and thereby form the covering for and to all that part or opening through such projection or continuation top plate and flue, designed or desired for the purpose of allowing the heat to come into contact with the immediate bottom of such reservoir or water-tank, and also forming an important combination of said chamber underneath such reservoir, as aforesaid, with the direct or exit-pipe or flue leading to the chimney, and extending upward through the inner part of such reservoir, or at the rear outside part, or immediately in the front and outside part of such reservoir or water-tank, thus arranged and supported upon such part of any cooking-stove, in the manner substantially as hereinafter described and set forth, while at the same time such projection of said flue immediately over the oven top plate, or such projection thus supporting such reservoir, forms a complete and perfect cover or top part of said heating or warming-closet, substantially as hereinafter described and set forth.

Having thus described the nature and object of my said invention and improvements contained in this, my second division of my application for reissue of my patent, dated January 18, 1859, and reissued in May, 1864, I will now proceed to describe the construction and operation of the same, which is as follows, to wit:

My cooking-stove I construct in general substantially as described in the first division accompanying this specification, and of even date herewith, or it may be constructed substantially as shown and described in my Letters Patent upon cooking-stoves, dated the 23d day of June, 1863. But the invention and improvements herein described, set forth, and contained in the claims hereto, may be applied to any cooking-stove usually made, in substantially the same manner as herein described and set forth.

A is the top plate of the cooking-stove, which covers the upper part of the fire-box or chamber, and which also covers or forms the upper part of the flue leading from the fire-box or chamber to the vertical flues at the rear end of the stove. It contains the usual and desired number of boiler-holes. This top plate I continue or extend over, beyond, and from the vertical flues B, figs. 3 and 4, as well as the rear vertical end plate of the stove, so as to receive and support the reservoir or water-tank, C, figs. 1, 2, and 3, or any equivalent therefor. The said top plate may thus be extended in one piece, or it may be cast or constructed in two or more parts, and thereafter bolted together or firmly fastened by other and suitable mechanical means, which will make the same sufficiently strong for the purposes intended. In that part of said plate so projecting or continuing, I construct an opening, of any size or shape, to contain the said reservoir or water-tank, and permit the heat to come in contact with the bottom of said reservoir, in the manner substantially as herein described and set forth.

It may all be in one opening, or there may be two or more, but I prefer but one such opening. The said reservoir or water-tank *c* may fit such opening, substantially as shown at fig. 1. I usually construct a flange around said opening, as seen at *a a*, fig. 1, which is cast upon the under side of said plate.

At or near the rear end of said top projecting plate, and in order to aid in the formation of the chamber D, directly below and underneath the said reservoir I arrange the plate E, which is closely fitted to the projecting plate A′, as well as to the bottom plate F of the said chamber or flue D, fig. 1, which bottom plate F is closely fitted to the rear vertical end plate, and thus the said chamber or flue D is constructed, while that side or part near to the rear end of the stove remains, opening into the upper part of the said vertical rear-end flues B, and on an air-line, and of the same or nearly the same capacity of the flue H, over the top of the oven I, and leading to the fire-chamber J as well as to the said chamber D underneath said reservoir C, in the manner as aforesaid. The parts necessary to form or construct such chamber D may be securely bolted together and to the cooking-stove, or secured together and thereto in any good and substantial manner, or by any sufficient mechanical means deemed best, in order to carry out the purpose intended by such chamber D, and thus there is formed a seat or projection to contain and support a reservoir or water-tank, for the purpose of heating the water in such reservoir by means of the waste heat, or the heat which remains after the products of combustion have passed over the oven, thence down the vertical and descending flue or flues on the rear end of the cooking-stove, thence under and along the under side of the bottom plate of the oven, and back through properly constructed flues to the ascending flue or flues in the rear end of the cooking-stove, and thus and thereby heating the water in such reservoir or water-tank without any expense of fuel beyond what would be necessary to carry on the ordinary work, such as boiling, baking, roasting, &c., &c.

When there are three vertical flues at the rear end of the cooking-stove, to which is applied the said chamber D, in the manner and for the purposes as herein stated, the flue upon either side of the centre flue will be so constructed and closed next to the said chamber D, as to prevent the heat or escaping products of combustion from passing into such chamber D, but to direct the same into and down the said side end vertical flues, so as to pass the same under and about the oven, in the manner substantially as aforesaid. But if it is desirable to heat the water in such reservoir or tank in haste, then the damper L, fig. 4, must be drawn or opened so as to let the heat or heated products of combustion pass directly over the centre end vertical flue to the chamber D, directly under the said reservoir, in the manner substantially as aforesaid. When said damper is closed, then the hot air or heated escaping products of combustion are directed into and pass down the vertical flues upon each side of the central vertical flue at the rear end of the cooking-stove, as aforesaid, after which they take the direction and course hereinbefore stated and set forth, and returning, pass up the central flue at the rear end of the stove into the said chamber or flue D, and under the bottom of said reservoir or water-tank, and thence into the pipe or tube or pipes and tubes passing into and through said reservoir or tank, as herein stated, and as shown at M, fig. 3, thereby heating the water in such reservoir, and then passing away into the chimney. The said chamber D, over which rests the said reservoir, may be constructed with the bottom and sides thereof in one part or piece, if deemed best so to do, with the same securely fastened to the stove, after which the top or extended top plate of the stove is placed over the same, with the reservoir or water-tank opening therein, and thus the whole thing is completed ready for use, or such chamber may be constructed in separate parts, and fastened together as aforesaid.

The said chamber D may be applied, in the manner substantially as aforesaid, to any cooking-stove having one descending and one ascending vertical flue in the rear end of such stove, or to any cooking-stove having two or more descending and two or more ascending vertical flues in the rear end of such stove, as the case may be. In all cases, the descending flue or flues have no direct communication with or opening into said chamber or flue D, at or near the top thereof, but are so constructed as to direct the heat or heated and escaping products down such flue or flues, and underneath the oven, as aforesaid. The ascending flue or flues are so constructed as to have direct communication to and with, and open at their respective upper ends into said chamber D, as and for the purposes substantially as aforesaid. The said chamber D may be of any capacity desired, in order to carry out the objects of the invention, which are herein stated and set forth. In all cases, such chamber will be constructed to correspond to the size, shape, or requirements of the cooking-stove, where the same is to be used.

The reservoir or water-tank C may be of any height or shape deemed best to use, but the size will always be made to correspond to that part or opening contained in the said extended plate A′, and it may be constructed of any kind of material deemed best. It is so arranged as to be movable or detachable from said cooking-stove, or, if deemed best, it may be fastened thereon and thereto. It is my design that the exit-pipe or pipes should pass up through said reservoir or water-tank, and thus and thereby aid in the heating of the water therein, the pipe continuing from the same to and into the chimney in the usual way, but it is manifest that such exit-pipe may extend from the said chamber D, at the extreme rear part of the same, and just outside of said reservoir upwards to the chimney of the dwelling where used, or it may extend from the front part of said chamber D upward in front of the said reservoir to the said chimney, as aforesaid. I prefer, though, that such pipe or pipes should pass upwards through said reservoir, substantially as herein set forth. Through the rear and vertical end plate G of a cooking-stove, and at or near the top part thereof, I construct a suitable opening, O, which may be of any size or capacity desired, and which is for the purpose of forming a communication with the chamber D underneath or just below the reservoir or water-tank C, so as to permit of the passage thereto of heat, hot air, or of the heated escaping products of combustion arising from the fire or combustion of fuel in the fire-chamber J, and thus and thereby heat or warm (as the case may be) the water in such reservoir or water-tank, without the requirement of any additional fuel than that required for boiling, baking, or other cooking purposes, and which fuel would be required to do the same, were there no such reservoir or water-tank, as herein described and set forth.

I arrange and combine with a cooking-stove such reservoir or water-tank, substantially as shown in and by the accompanying drawings, and thus and thereby I economize largely in the use of room or space around and about such cooking-stove, as well as also economize very largely in the use of the fuel or heat, for by so doing I am enabled to always provide or have on hand, ready for any use required, warm or hot water during all the time while the stove is in a heated condition, substantially as herein described and set forth.

P is a chamber or flue, extending from the bottom centre flue, or from all the flues in the bottom of the stove, upwards, until it comes in contact with the chamber or flue, D, under the said reservoir. This flue or chamber P is constructed outside of the said vertical end plate G of the cooking-stove, and a portion of such end plate is removed, so as to receive the proper and necessary plate or parts required to form such chamber P, which communicates, at its lower end, with the space or flues under the oven, and at its upper end with the chamber or flue over which rests and remains said reservoir or water-tank, substantially as hereinbefore set forth.

The said reservoir may have a part or portion thereof resting over the upper part of said rear-end vertical flues, or such reservoir may have the front part thereof upon a line with the inner-end oven-plate, whereby the whole of said end vertical flues would be covered over with a part of the bottom of said water-tank, if deemed best so to arrange the same. I generally prefer to have the front edge or perpendicular part of said reservoir or water-tank upon a line, or nearly so, with the back end or end plate of the stove, but it is manifest that any variation from an exact perpendicular line with such end or end plate of the stove would make no difference with the real invention or operation thereof herein contained and set forth, but it would be substantially the same. The said chamber, immediately underneath said reservoir or tank, will, in all cases, open into the said vertical flues, or it may be immediately connected and combined with said flues over the immediate top plate of the oven, and in all cases such chamber will be directly underneath the bottom of said reservoir or water-tank, and it may be formed by one or more pieces, and then firmly and securely fastened to the said rear end of the stove by any good and sufficient mechanical means which will hold in part or the whole of such reservoir or water-tank, and the water or contents therein. The top plate of the stove may, as before stated, be cast whole, and extend out and over such chamber D, or it may be made in two or more parts or pieces, and then firmly fastened together by means of bolts and screws, or by any other suitable means, while other parts forming such chamber, to wit, the sides and bottom part, may be bolted thereto in any convenient and suitable manner.

L is a damper, which closes the centre back flue, and directs the hot air, or escaping products of combustion, into and down the rear-end vertical flue, which, passing along the bottom of the stove into the centre flue, and up the centre vertical back or end flue, and then under the said reservoir or water-tank, and thence up through the exit-pipe or pipes. If said damper be open, then the hot air, or heated escaping products of combustion, will pass directly underneath the reservoir or water-tank, and to the said exit-pipe or pipes, thereby heating the water in such reservoir or water-tank without any additional fuel than that required for baking or cooking, in or by said cooking-stove, as aforesaid.

Directly underneath said chamber, D, and immediately in the rear of said cooking-stove, I arrange and construct a heating or warming-closet, S. It is deemed best to extend such closet outward as far as the said reservoir or water-tank extends from the rear end of the stove, but it is evident that it may extend outward to any distance required or desired. It is usually constructed of the same length as is the width of the cooking-stove, and it extends downward to the bottom plate of the stove, if deemed best so to do. It has suitable doors at each end thereof, which open into such closet for the purpose of putting therein, upon suitable shelves, articles desired to be kept warm or hot.

This closet I usually construct of tin, and ornament the same upon its sides and ends and doors in some suitable manner.

K K represent the line of the framework of such closet, which may be of any suitable material.

The said closet is fastened to the rear end of said stove, and to the projecting plate F, forming the bottom of the chamber D, as aforesaid, in and by any suitable means, which will firmly hold the said closet to its proper place in and upon the rear of such stove.

The said closet may have any suitable framework, with the tin or other sheet metal applied thereto, so as to form and complete said closet.

The rear end vertical plate of such stove will form the one side of such warming-closet, and sufficient heat will pass through said plate for all warming purposes, of any articles of food, or other thing in said closet desired to be kept warm or hot.

The top part of said closet is formed by means of that part or plate projecting outward from the said end plate of the stove, substantially as aforesaid, through which plate also some heat will pass into such closet for warming purposes, as aforesaid.

Said closet may be constructed in different ways, all of which it is not deemed essential to describe in detail in this specification, and applied to any cooking-stove, substantially as aforesaid.

This closet may have two or more shelves therein, to receive articles which it is desirable to keep warm.

The said closet may be of any capacity deemed best, and it may thereafter be secured to said stove upon the rear end thereof, and underneath said reservoir or water-tank and chamber thereunder, as aforesaid, in any suitable manner and by any suitable means, substantially as and for the purposes aforesaid.

Having thus described the nature, construction, and operation of my said invention, contained in this division or specification, what I claim, and desire to secure by Letters Patent of the United States of America, is—

1. The employment and arrangement of the top plate of a cooking-stove, having a flue or flues immediately thereunder, and extended over and beyond the rear end and upper portion of the vertical flues, back of the oven thereof, in such manner as to receive and support a reservoir or water-tank upon or over a suitable opening therein, and with a heating-chamber immediately below or underneath the same, in the manner and for the purposes substantially as herein described and set forth.

2. The arrangement and employment of the heating-chamber D, or its equivalent, in combination with the rear vertical end flues of a cooking-stove, and with the reservoir or water-tank C, in the manner and for the purposes substantially as hereinbefore fully described and set forth.

3. The combination of the chamber D, extending beyond the rear end of a cooking-stove, and situated under or immediately below the reservoir or water-tank C, with the flue H extending from the fire-chamber or chamber of combustion, and over the top plate of the oven, and with the vertical rear-end flues of a cooking-stove, in the manner and for the purposes substantially as herein described and set forth.

4. The arrangement and employment of the reservoir or water-tank C in or upon and with the extended top plate A and A′ of a cooking-stove, and heating-chamber D, in combination with the heating or warming-closet S, in the manner and for the purposes substantially as herein described and set forth.

5. The arrangement and combination of the heating or warming-closet S, or any equivalent thereof, upon the rear end of a cooking-stove containing vertical flues, in the manner and for the purposes substantially as herein described and set forth.

6. An opening, O, in and through the rear end vertical plate of a cooking-stove, of sufficient capacity to allow the passage of hot air, or of the heated escaping products of combustion, through the same, and into a chamber underneath a reservoir or water-tank, so as to warm or heat the water therein, in the manner substantially as herein described and set forth.

7. The combination of an exit chimney-pipe or flue with the heating-chamber D, underneath the reservoir or water-tank C, in the manner and for the purposes substantially as herein described and set forth.

8. The arrangement of a reservoir or water-tank upon the extended top plate of a cooking-stove, and supported over or beyond the rear-end vertical flues of a cooking-stove, in the manner and for the purposes substantially as herein described and set forth.

9. The vertical end plate of a cooking-stove, containing the opening O, or any equivalent therein, for the passage of the hot air or escaping heated products of combustion into a suitable chamber underneath the reservoir or water-tank, the same being regulated or controlled by a suitable damper, L, and all combined with a cooking-stove, in the manner substantially as herein described and set forth.

10. The combination of the chamber or flue P with the vertical flues between the oven and the rear end plate of a cooking-stove, and with the chamber D, and with the flue or flues in the bottom of the stove, in the manner and for the purposes substantially as herein described and set forth.

11. A reservoir or water-tank, for the warming or heating of water therein, or for other purposes, arranged and combined with a cooking-stove having vertical flues in the rear end thereof, and in the rear of the oven of such cooking-stove, substantially as herein described and set forth.

In testimony whereof, I have, on this 1st day of January, 1868, hereto affixed my name, in the presence of two witnesses, to wit:

PHILO P. STEWART.

Witnesses:

CHARLES D. KELLUM,
MARCUS P. NORTON.